United States Patent [19]
Dunn

[11] 3,756,580
[45] Sept. 4, 1973

[54] GAS WASHING APPARATUS
[75] Inventor: John Dunn, Mountvale, N.J.
[73] Assignee: Peabody Engineering Corporation, New York, N.Y.
[22] Filed: Jan. 31, 1972
[21] Appl. No.: 222,045

[52] U.S. Cl.......... 261/123, 261/124, 261/DIG. 54, 55/255, 55/256
[51] Int. Cl............................................. B01f 3/04
[58] Field of Search...................... 55/255, 256, 355; 261/DIG. 54, 123, 124

[56] References Cited
UNITED STATES PATENTS

| | | | |
|---|---|---|---|
| 3,138,441 | 6/1964 | Krantz | 261/DIG. 54 |
| 3,290,308 | 12/1966 | Marten | 261/DIG. 54 |
| 3,334,470 | 8/1967 | Huppke | 261/DIG. 54 |
| 3,339,344 | 9/1967 | Pallinger | 261/DIG. 54 |
| 3,414,247 | 12/1968 | Sama | 261/DIG. 54 |
| 3,524,630 | 8/1970 | Marion | 261/DIG. 54 |
| 3,676,982 | 7/1972 | Price | 55/256 |
| 3,721,429 | 3/1973 | Young et al. | 55/355 |

FOREIGN PATENTS OR APPLICATIONS

| | | | |
|---|---|---|---|
| 543,412 | 11/1921 | France | 55/256 |
| 868,291 | 12/1940 | France | 55/255 |
| 1,333,775 | 6/1963 | France | 137/253 |

Primary Examiner—Tim R. Miles
Assistant Examiner—Steven H. Markowitz
Attorney—Nathaniel L. Leek

[57] ABSTRACT

A gas washing apparatus including an inlet duct with its discharge end submerged in a liquid and having peripheral openings below the level of such liquid but adapted to be exposed by the depression of the liquid level within said duct due to the gas pressure therein. Flared vanes extend outwardly from said openings into the liquid to form a venturi effect. The discharged gases bubble upwardly through the liquid and are passed through a drying apparatus for the removal of entrained liquid droplets.

12 Claims, 7 Drawing Figures

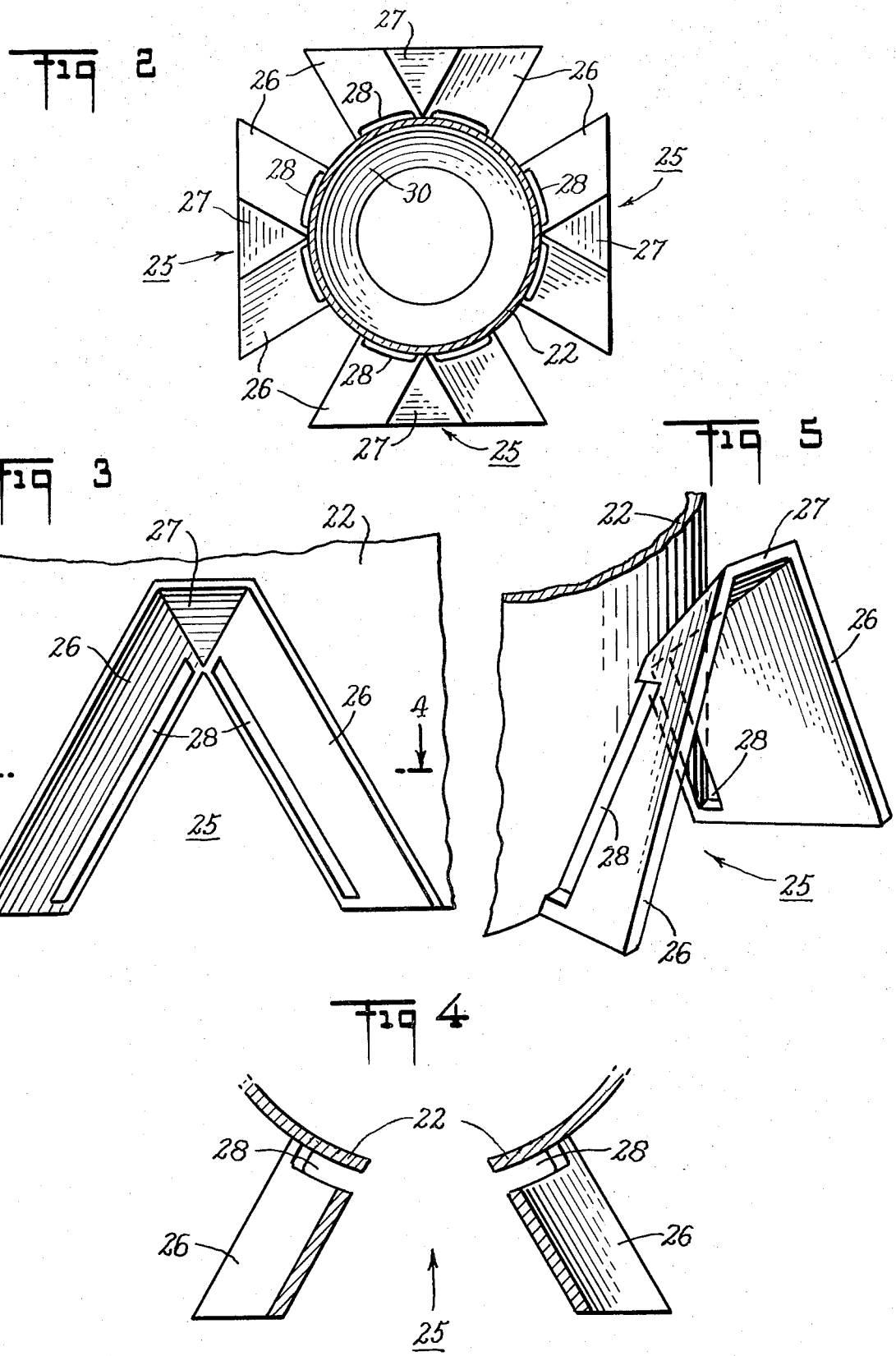

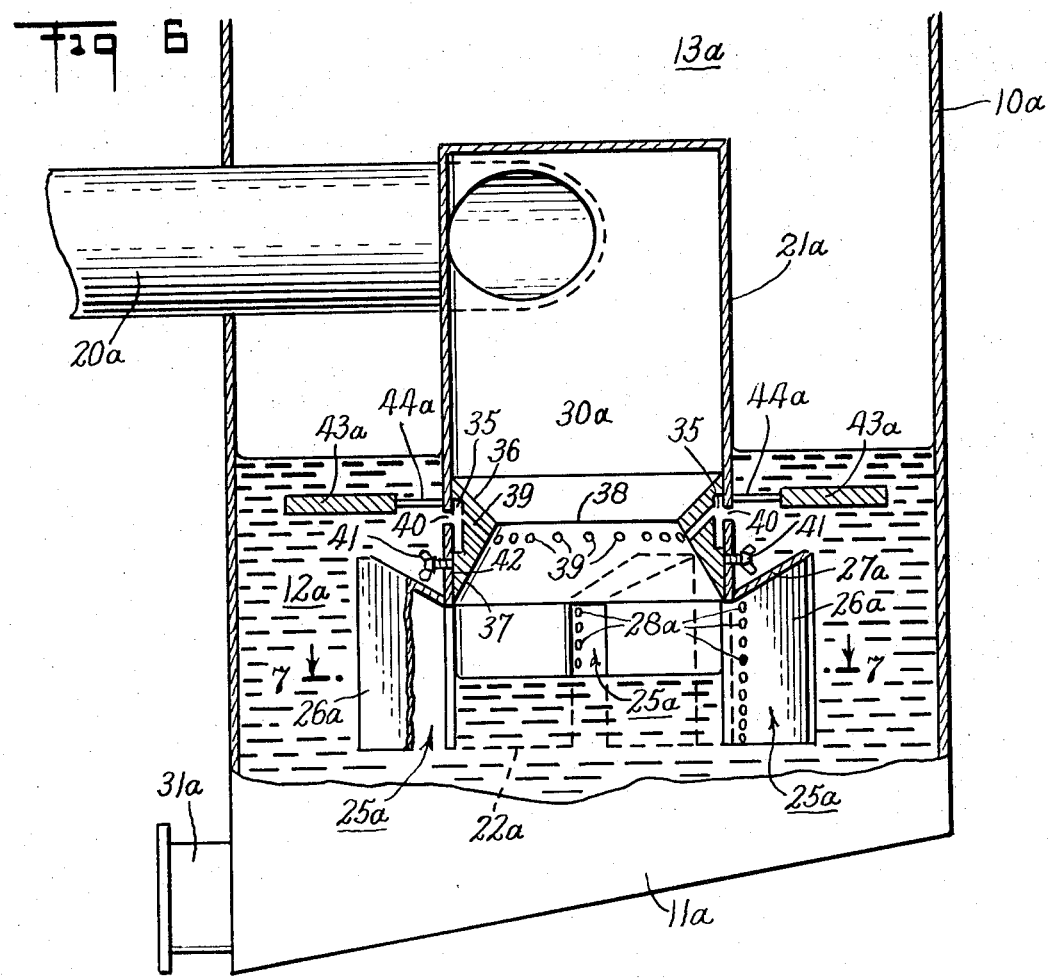
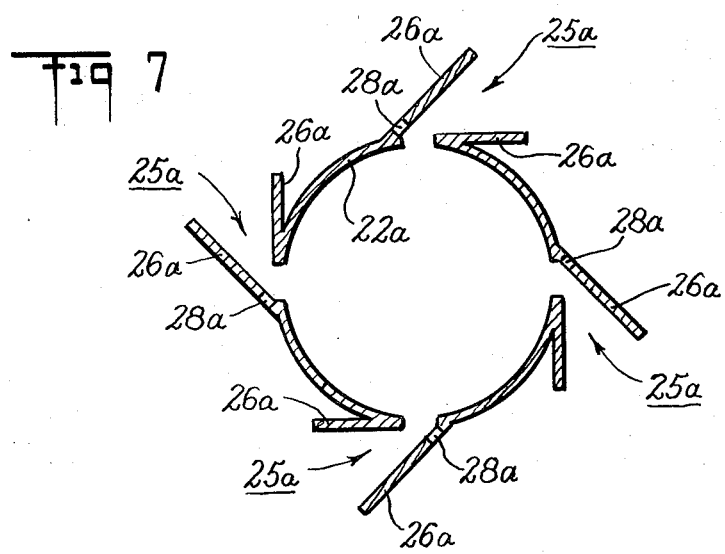

GAS WASHING APPARATUS

This invention relates to apparatus for washing gases and more particularly to apparatus wherein gases are introduced into a liquid bath from an inlet gas duct.

An object is to provide apparatus of the above type where particulate matter is removed by the liquid as the gas passes therethrough.

Another object is to provide novel and improved apparatus of the above type.

A further object is to utilize the kinetic energy of the gas and of the entrained particles to effect the efficient removal thereof.

Another object is to provide such an apparatus wherein the gas velocity remains substantially constant regardless of changes in gas volume.

Various other objects and advantages will be apparent as the nature of the invention is more fully disclosed.

In accordance with the present invention the gas to be washed is introduced into a liquid bath from a duct which terminates a predetermined distance below the level of the liquid such that the pressure of the gas in the duct depresses the level of the liquid within the duct but to such an extent that the liquid level is not depressed below the level of the end of the duct. The submerged portion of the duct is provided with peripherally spaced openings which are variably exposed to the gas within the duct as the liquid level is depressed, the amount of the openings so exposed varying with the gas volume and the consequent changes in liquid level within the duct. The shape of the duct and of the openings is such that a venturi effect is produced which is substantially independent of changes in gas volume. Due to this venturi action and the change in direction of the gas flow the particulate material is caught in the liquid and the stripped gas bubbles upwardly into a liquid removal or drying zone from which it is discharged.

The details of the invention will be better understood from the following description, taken in connection with the accompanying drawings in which certain specific embodiments have been set forth for purposes of illustration.

In the drawings:

FIG. 2 is a section through the inlet duct taken on the line 2—2 of FIG. 1;

FIG. 3 is an enlarged detail view showing one of the discharge openings in the duct;

FIG. 4 is a section taken on the line 4—4 of FIG. 3 showing the arrangement of the discharge vanes; and FIG. 5 is a partial perspective view of the end of the supply duct illustrating the arrangement of the vanes and discharge openings.

FIG. 6 is a vertical section similar to FIG. 1 illustrating a further embodiment of the invention; and FIG. 7 is a horizontal section taken on the line 7—7 of FIG. 6.

Figure 1:
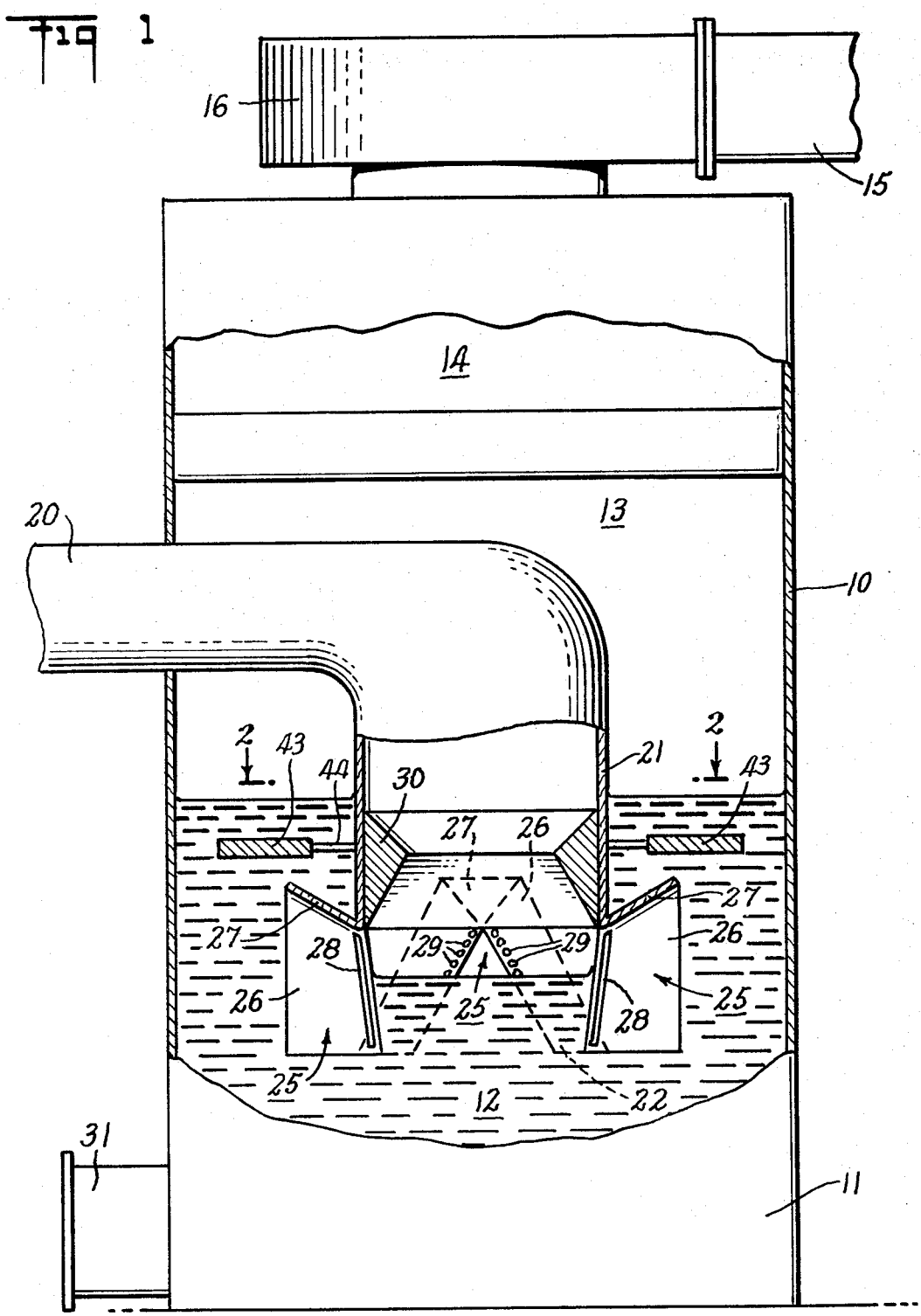
FIG. 1 is a vertical section through a gas washing and drying unit embodying the invention.

Referring to the drawings more in detail, the apparatus is shown as comprising a vessel 10 having at its lower end a liquid reservoir 11 containing a bath of wash liquid 12. Above the reservoir 11 is a gas drying zone 13 containing gas drying apparatus of any standard type adapted for the removal of liquid droplets from the gases, a zone 14 for the dried gases and a discharge duct 15 into which the washed and dried gases are passed by a fan 16. Obviously, the fan may be disposed in advance of the inlet duct to force the gases through the apparatus or in some cases fans may be used in both locations.

The gases are introduced into the apparatus through an inlet duct 20 which extends through a side wall of the vessel 10 and downwardly through a duct 21 with its lower end 22 immersed below the level of the liquid 12. The level of the liquid in the duct 21 is depressed below the level of the liquid in the reservoir 11 due to the pressure of the gas in the inlet duct, the amount of such depression varying with changes in gas volume.

The submerged portion 22 of the duct 21 is provided with a plurality of peripherally spaced openings 25 which are shown as V-shaped with their apexes at the top. Such openings may, however, be made rectangular or of any other desired shape according to the results desired.

Attached to the outside of the duct 21 along each longitudinal side of each such opening 25 is a vane 26. These vanes 26 are flared outwardly to form a venturi throat or vena constricta through which the gases are discharged into the liquid 12 outside of the duct 21. The flared vanes 26 are shown as closed at their upper edges by closure strips 27 so as to complete the venturi configuration. Each vane 26 has at its inner edge a slot or series of orifices 28 through which liquid from the reservoir 11 is introduced into the gas stream for prewetting and conditioning the suspended particulate material.

The arrangement is such that the gases which are introduced vertically downwardly in the duct 21 are turned at right angles in the vena constrictas to pass outwardly into the outside liquid through the portions of the openings 25 which are exposed by the depression in the liquid level in the duct with an increase in velocity due to the venturi effect of the vanes 26.

The particulate material is caught in the liquid within the duct 21 and by the outside liquid injected through the openings 28 into the vena constricta of the venturi and the stripped gases after passing through the venturi bubble upwardly through the liquid into the drying zone 13 in which any entrained droplets are removed. A horizontal annular baffle 43 is disposed within the liquid 12 in the path of the bubbles discharged from the vena constricta passages and supported by rods 44 attached to the duct 21. The arrangement is such that the rising bubbles impinge on the baffle 43 and are deflected thereby in their path to the surface of the liquid so as to prevent accumulation of bubbles and the formation of a continuous gas stream which would reduce the area of contact of the rising bubbles with the liquid 12.

In order to properly direct the gas within the duct 21, an orifice ring 30 may be disposed within the duct below the level of the outside liquid and may be adjusted axially as desired and secured in adjusted position. This ring 30 forms a throat which increases the velocity of the gases and the inertia of the particulate material which impinges on the liquid at the end of the duct 21.

The separated particulate matter may be removed periodically from the reservoir 11 through discharge opening 31 by any suitable means and the stripped and dried gases pass into the discharge duct 15.

In the embodiments of FIGS. 6 and 7 parts corresponding to those of FIGS. 1 to 5 have been given the same reference characters with the suffix a for convenience. In this form the horizontal inlet duct 20a enters the vertical duct 21a at a tangent so that the gases are caused to rotate as they advance along the duct 21a.

The lower end 22a of the duct 21a is disposed below the level of the liquid 12a in the reservoir 10a and is provided with a series of vertical slots 25a of rectangular section. Vanes 26a are disposed to extend into the liquid from opposite sides of each slot 25a and are flared outwardly similarly to the vanes 26 of FIGS. 1 to 5 to form a venturi throat for the fluids passing through the slots 25a, except that the vanes 26a extend in a substantially tangential direction from the openings 25a. Plates 27a form top closures for the passages thus formed. These vanes 26a are provided with openings 28a at their inner ends. These openings provide for the injection of liquid from the reservoir 11a into the gas stream within the portion 22a of the duct 21a in the form of jets which entrap suspended particles as the gases pass therethrough.

An orifice ring 30a is positioned in the lower portion 22a of the duct 21a below the level of the liquid in the reservoir 11a on the outside of the duct 21a but above the level of the liquid within this duct. This orifice ring 30a is formed with a relatively wide peripheral channel 35 in its outer periphery. The ring is also formed with oppositely flared surfaces 36 and 37 on its inner periphery meeting in an apex 38 of minimum diameter adapted to form a throat in the air passage within the duct. A series of radial passages 39 extend from the outer channel 35 to the inner periphery below the point 38 of minimum diameter. A series of holes 40 are formed in the wall of the duct 21a to communicate with the channel 35 so that liquid from the reservoir 10a enters the channel 35 through holes 40 and is discharged as liquid jets through orifices 39 into the gas stream in the duct 21a.

The ring 30a is adjustable axially of the duct 21a and may be clamped in adjusted position by means of bolts 41 which are threaded into the wall of the duct 21a and engage the surface 42 of the ring 30a below the channel 35. The arrangement is such that the ring may be adjusted to its most effective position for the volume of gases being passed through the duct 21a and may be clamped in such position by manipulation of the bolts 41.

The operation of this embodiment is similar to that of FIGS. 1 to 5 with the additional provision of the tangential inlet of the gases into the duct 21a and the tangential discharge between the vanes 26a which, in some instances, serves to increase the efficiency of the device. The introduction of liquid jets into the gas stream from the orifices 39 also assists in entrapping and removing entrained particles. The ring 30a also increases the gas velocity at the point of contact with the liquid jets so that the liquid droplets are mixed with the rotating gas stream and carried thereby through the vena constrictas into the liquid in the reservoir while the cleaned gases bubble upwardly through the liquid layer into the drying zone 13a after impingement on the baffle 43a.

It is to be understood that the various individual features of the apparatus of FIGS. 6 and 7 may be substituted for the corresponding features of the apparatus of FIGS. 1 to 5 and that various combinations of features may be made according to the requirements in any particular case. The invention provides primarily for maintaining a substantially constant pressure drop in the gases through the cleaning apparatus regardless of changes in volume of gases being treated.

While specific embodiments have been shown for purposes of illustration, it is to be understood that various changes and modifications may be made therein as will be apparent to the person skilled in the art. The scope of the invention is to be limited only in accordance with the following claims.

What is claimed is:

1. Apparatus for washing gases comprising a vessel having a liquid reservoir adapted to contain a wash liquid, a gas inlet duct having its discharge end immersed in the liquid in said reservoir, said duct having a plurality of spaced peripheral openings in its submerged portion, said openings having areas to be exposed due to the depression of the liquid level within said duct due to the gas pressure therein, whereby the gases are discharged outwardly through said openings into the liquid in said reservoir and bubble upwardly therethrough for removing suspended particulate material, outwardly flared vanes disposed by the discharge end of said duct adjacent said openings for forming a vena constricta effect and thus increasing the velocity of the discharged gases, said vanes having openings therethrough for the injection of liquid from the outside of the duct as jets into the gas stream in said vena constricta.

2. Apparatus as set forth in claim 1 in which said vena constricta extends radially outward into said liquid.

3. Apparatus as set forth in claim 1 in which said vena constricta extends substantially tangentially of said duct.

4. Apparatus as set forth in claim 1 including a baffle member disposed in said liquid in the path of the rising bubbles on which the bubbles impinge and are deflected before emerging from the surface of said liquid.

5. Apparatus as set forth in claim 1 in which said openings are triangular in shape.

6. Apparatus as set forth in claim 5 in which flared vanes extend along the longitudinal sides of said openings.

7. Apparatus as set forth in claim 1 in which an orifice ring is disposed within said duct at the discharge end thereof below the level of the outside liquid for increasing the gas velocity in said duct.

8. Apparatus as set forth in claim 7 in which said orifice ring is provided with means for introducing liquid jets into the gas stream in said duct.

9. Apparatus as set forth in claim 7 in which said ring is provided with an annular passage and with radial passages communicating therewith to discharge jets of liquid into the gas stream in said duct.

10. Apparatus as set forth in claim 7 in which said duct is provided with openings communicating with said annular passage below the level of the liquid surrounding said duct.

11. Apparatus as set forth in claim 7 in which means is provided for adjusting the axial position of said ring and securing the same in adjusted position.

12. Apparatus as set forth in claim 1 including a gas drying zone for removing entrained liquid droplets from the washed gases.

* * * * *